United States Patent [19]
Yokota et al.

[11] Patent Number: 5,706,262
[45] Date of Patent: Jan. 6, 1998

[54] RECORDING AND REPRODUCING APPARATUS THAT ALLOWS USER REORDERING OF THE SEQUENCE THAT DATA IS REPRODUCED FROM THE DISC AND THAT AUTOMATICALLY REORDERS THE REMAINING DATA AFTER DATA DEFINED BY THE USER HAS BEEN ERASED

[75] Inventors: Teppei Yokota; Junichi Aramaki, both of Chiba; Nobuyuki Kihara, Tokyo, all of Japan

[73] Assignee: Sony Corporation, Tokyo, Japan

[21] Appl. No.: 691,217

[22] Filed: Aug. 1, 1996

Related U.S. Application Data

[63] Continuation of Ser. No. 569,001, Dec. 7, 1995, abandoned, which is a continuation of Ser. No. 163,669, Dec. 3, 1993, abandoned.

[30] Foreign Application Priority Data

Dec. 4, 1992 [JP] Japan ................................. 4-350236

[51] Int. Cl.⁶ .................................................. G11B 7/00
[52] U.S. Cl. ................................................ 369/32; 369/48
[58] Field of Search ................................. 369/54, 58, 48, 369/32, 47, 50; 360/72.2, 72.1

[56] References Cited

U.S. PATENT DOCUMENTS 4,210,785  7/1980  Huber et al. ..................... 360/12 X
5,124,963  6/1992  Ando ................................. 369/54
5,291,462  3/1994  Richards .......................... 369/13

FOREIGN PATENT DOCUMENTS 0 281 415  9/1988  European Pat. Off. .
0 310 678  4/1989  European Pat. Off. .
0 346 979  12/1989  European Pat. Off. .
0 377 340  7/1990  European Pat. Off. .

OTHER PUBLICATIONS

Image Technology (Journal of the BKSTS), Sony MiniDisc System, Nov. 1992, vol. 74, No. 9, pp. 180–182, London, GB.

Fundamentals of Data Structures, Horowitz and Sahni, 1977, pp. 169–183.

Primary Examiner—W. R. Young
Attorney, Agent, or Firm—Limbach & Limbach L.L.P.

[57] ABSTRACT

A recording and reproducing apparatus corresponding to a recording medium having management information (U-TOC) for managing the order of reproduction and reproducing operations for recorded data (pieces of music), having a controller which makes it possible to rewrite the management information when the order of the data is specified by a program so that the order of reproduction is changed in accordance with the order of data specified by the program on the recording medium (F110) or to rewrite the management data so that the data specified by the program become erased data (F106), allowing the erasure of plural pieces of music and the changing of the order of reproduction to be carried out easily.

20 Claims, 9 Drawing Sheets

FIG. 1a

| $M_1$ | $M_2$ | $M_3$ | $M_4$ | $M_5$ |
|---|---|---|---|---|
| 1st piece | 2nd piece | 3rd piece | 4th piece | 5th piece |

FIG. 1b

| $M_1$ | $M_2$ | ✗ | $M_4$ | $M_5$ |
|---|---|---|---|---|
| 1st piece | 2nd piece | | 3rd piece | 4th piece |

FIG. 1c

| $M_1$ | $M_2$ | ✗ | ✗ | $M_5$ |
|---|---|---|---|---|
| 1st piece | 2nd piece | | | 3rd piece |

FIG. 4

| | 16bit | | 16bit | | |
|---|---|---|---|---|---|
| | MSB      LSB | MSB      LSB | MSB      LSB | MSB      LSB | |
| header { | 0 0 0 0 0 0 0 0 | 1 1 1 1 1 1 1 1 | 1 1 1 1 1 1 1 1 | 1 1 1 1 1 1 1 1 | 0 |
| | 1 1 1 1 1 1 1 1 | 1 1 1 1 1 1 1 1 | 1 1 1 1 1 1 1 1 | 1 1 1 1 1 1 1 1 | 1 |
| | 1 1 1 1 1 1 1 1 | 1 1 1 1 1 1 1 1 | 1 1 1 1 1 1 1 1 | 0 0 0 0 0 0 0 0 | 2 |
| | Cluster | Cluster | 0 0 0 0 0 0 0 0 | 0 0 0 0 0 0 0 0 | 3 |
| | 0 0 0 0 0 0 0 0 | 0 0 0 0 0 0 0 0 | 0 0 0 0 0 0 0 0 | 0 0 0 0 0 0 0 0 | 4 |
| | 0 0 0 0 0 0 0 0 | 0 0 0 0 0 0 0 0 | 0 0 0 0 0 0 0 0 | 0 0 0 0 0 0 0 0 | 5 |
| | | | | | 6 |
| | | | First TNO | Last TNO | 7 |
| | | | | Used Sectors | 8 |
| | | | | | 9 |
| | | | | Disc Serial No | 10 |
| corresponding table indication data position { | Disc | ID | P-DFA | P-EMPTY | 11 |
| | P-FRA | P-TNO1 | P-TNO2 | P-TNO3 | 12 |
| | P-TNO4 | P-TNO5 | P-TNO6 | P-TNO7 | 13 |
| | P-TNO248 | P-TNO249 | P-TNO250 | P-TNO251 | 74 |
| | P-TNO252 | P-TNO253 | P-TNO254 | P-TNO255 | 75 |
| | | | | | 76 |
| | | | | | 77 |
| (01) | start address | | | track mode | 78 |
| | end address | | | link information | 79 |
| (02) | start address | | | track mode | 80 |
| | end address | | | link information | 81 |
| (03) | start address | | | track mode | 82 |
| | end address | | | link information | 83 |
| management table portion (255 parts table) (FC) | start address | | | track mode | 500 |
| | end address | | | link information | 581 |
| (FD) | start address | | | track mode | 582 |
| | end address | | | link information | 583 |
| (FE) | start address | | | track mode | 584 |
| | end address | | | link information | 585 |
| (FF) | start address | | | track mode | 586 |
| | end address | | | link information | 587 |

Program Mode Process

FIG. 7

(a) Erase ?

| 1 | 2 |   | 4 |   |
| 6 |   |   |   |   |
|   |   |   |   |   |
|   |   |   |   |   |

(b) Complete

| 1 | 2 | 3 |   |   |
|   |   |   |   |   |
|   |   |   |   |   |
|   |   |   |   |   |

(c) Renumber

| 1 | 2 |   | 4 |   |
| 6 |   |   |   |   |
|   |   |   |   |   |
|   |   |   |   |   |

(d) Complete

| 1 | 2 | 3 | 4 | 5 |
| 6 | 7 |   |   |   |
|   |   |   |   |   |
|   |   |   |   |   |

Program Erasing Process

Program Renumbering Process

RECORDING AND REPRODUCING APPARATUS THAT ALLOWS USER REORDERING OF THE SEQUENCE THAT DATA IS REPRODUCED FROM THE DISC AND THAT AUTOMATICALLY REORDERS THE REMAINING DATA AFTER DATA DEFINED BY THE USER HAS BEEN ERASED This is a continuation of application Ser. No. 08/569,001, filed on Dec. 7, 1995 now abandoned, which is a continuation of application Ser. No. 08/163,669, filed Dec. 3, 1993, now abandoned.

FIELD OF THE INVENTION

The present invention relates to a recording and reproducing apparatus for a disc type recording medium capable of recording data such as music.

BACKGROUND OF THE INVENTION

Data-rewritable disc media on which a user can record data such as music data are known. Such disc media have a data region for managing sections having data such as music recorded thereon and unrecorded sections (TOCs and User TOCs, which are hereinafter referred to as U-TOCs), and management information can be rewritten each time an operation such as recording, editing, and erasing is finished.

To record a piece of music, for example, a recording apparatus finds an unrecorded area on the disc from the U-TOC and records sound data thereon. A reproducing apparatus determines an area having a piece of music recorded thereon and accesses the area to perform reproduction.

Recordable disc media such as magneto-optical discs (MO discs) are very easy to access randomly compared with tape-type recording media such as DAT's and compact cassette tapes. Therefore, it is easy to reproduce pieces of music in an order independent of the order in which they were recorded. For example, compact discs can sequentially reproduce pieces of music recorded thereon in a desired order through a well-known programmed reproduction technique which allows a user to program the order in which pieces are reproduced. However, since in this case the TOC is not rewritten, programming must be newly performed for each reproduction. Although the data to be recorded are not limited to pieces of music, it is assumed in this specification that the data recorded are pieces of music.

As described above, it goes without saying that a magneto-optical disc having TOC and U-TOC can perform programmed reproduction in the same manner as a compact disc. By rewriting the U-TOC, the original order of reproduction (This is the order of reproduction in a normal reproduction operation which is not specifically programmed by the user. This order is normally in accordance with the title numbers for pieces of music, assigned in the order in which they were recorded) can be changed. In other words, the U-TOC maintains information specifying the area for each of the recorded pieces of music from the first to the last and, therefore, it is possible to change the order of reproduction by simply changing the areas specified.

Pieces of music may also be erased by rewriting the U-TOC.

However, the operation of changing the order of pieces of music and deleting particular pieces of music is often too complicated for a user to easily perform.

In order to explain the erasure of pieces of music, assume that five pieces of music M1 to M5 are recorded as shown in FIG. 1(a) and the user wants to erase the third and fourth pieces of music M3 and M4.

To erase M3, the third piece of music in the U-TOC is changed to M4 and the fourth piece of music is changed to M5. As a result, the U-TOC is changed so that the piece of music which was originally the third piece of music is erased as shown in FIG. 1(b), and it is indicated that the other four pieces of music are recorded on the disc as M1, M2, M4 and M5.

Since at this point in time, the piece of music M4 which was originally the fourth piece of music has not yet been erased, the erasing operation must be continued. In this case, the user must specify the third piece of music instead of the fourth piece as the piece of music to be erased. By instructing the erasure of the third piece, the pieces of music M3 and M4 which were designated as the third and fourth pieces of music are erased as shown in FIG. 1(c) and the pieces of music which were originally the first, second and fifth pieces of music are retained as the new first, second and third pieces of music M1, M2 and M5.

In other words, when a user wishes to erase a number of pieces of music at a time, the title numbers assigned to the pieces of music change each time an erasing operation is performed, making it difficult for the user to keep track of the correspondence between the pieces of music to be erased and the title numbers assigned to the pieces of music. As a result, the user may mistakenly erase pieces of music which the user does not want to erase.

This also holds true for the changing of the order in which the pieces of music are reproduced. Each time the order of reproduction of a particular piece of music is changed, the title numbers assigned for other pieces of music are changed. Reordering a plurality of pieces of music will require the user to carry out operations which are very complicated and difficult to understand.

SUMMARY OF THE INVENTION

The present invention has been conceived in light of the above problems has as its object to provide a recording and reproducing apparatus which makes it easy to change the order of reproduction of a plurality of data and to delete particular reproduction data.

In order to achieve this, a recording and reproducing apparatus adapted for a recording medium having management information for specifying the order of reproduction of recorded data, i.e. a U-TOC which can specify a recording area corresponding to a title number, is equipped with a control means for allowing the management information on the recording medium to be rewritten after the order of data relating to a plurality of data (e.g. music) is specified by a program so that the order of reproduction is changed in accordance with the order of data specified by the program.

Also, a recording and reproducing apparatus adapted for a recording medium having management information for managing reproduction operations for recorded data is equipped with a control means for allowing said management information on the recording medium to be rewritten when a plurality of data is specified by a program so that all the data specified by the program become erased data.

Further, there is provided a selection means for causing a control means to perform, when a plurality of data relating to data recorded on a recording medium are specified by a program, either a program reproduction operation for performing reproduction of data in the order specified by the program, a program renumber operation for rewriting the management information on a recording medium so that the order of reproduction is changed in accordance with the order of data specified by the program, or a program erase operation for rewriting the management information on the recording medium so that all of the data specified by the program becomes erased data.

After programming, if erasure, or rewriting of the U-TOC so as to change the order of the pieces of music to that of the program, is executed once, it is unnecessary for the user to perform an operation to erase the pieces of music one at a time or change the order of the pieces one at a time, there is no need for the user to pay attention to the correspondence state between the pieces of music and the title numbers, user operations can be simplified, and the mistakes in the erasure and order change operations can be prevented.

BRIEF DESCRIPTION OF THE DRAWINGS

FIGS. 1a-1c illustrate a conventional erasing process on recorded data.

FIG. 4 illustrates the structure of a U-TOC of a magneto-optical disc adapted for an embodiment of the present invention.

FIG. 7(a-d) illustrates a display process in a program mode according to an embodiment of the present invention.

DETAILED DESCRIPTION OF THE INVENTION

An embodiment of the present invention will now be described. The configuration of the recording and reproducing apparatus of the embodiment will first be described using FIG. 2 and FIG. 3, then there will be an explanation of the management data written as U-TOC information in a magneto-optical disc corresponding to the recording and reproducing apparatus using FIG. 4 and FIG. 5, after which the operation of the present embodiment will be explained.

Figure 2:
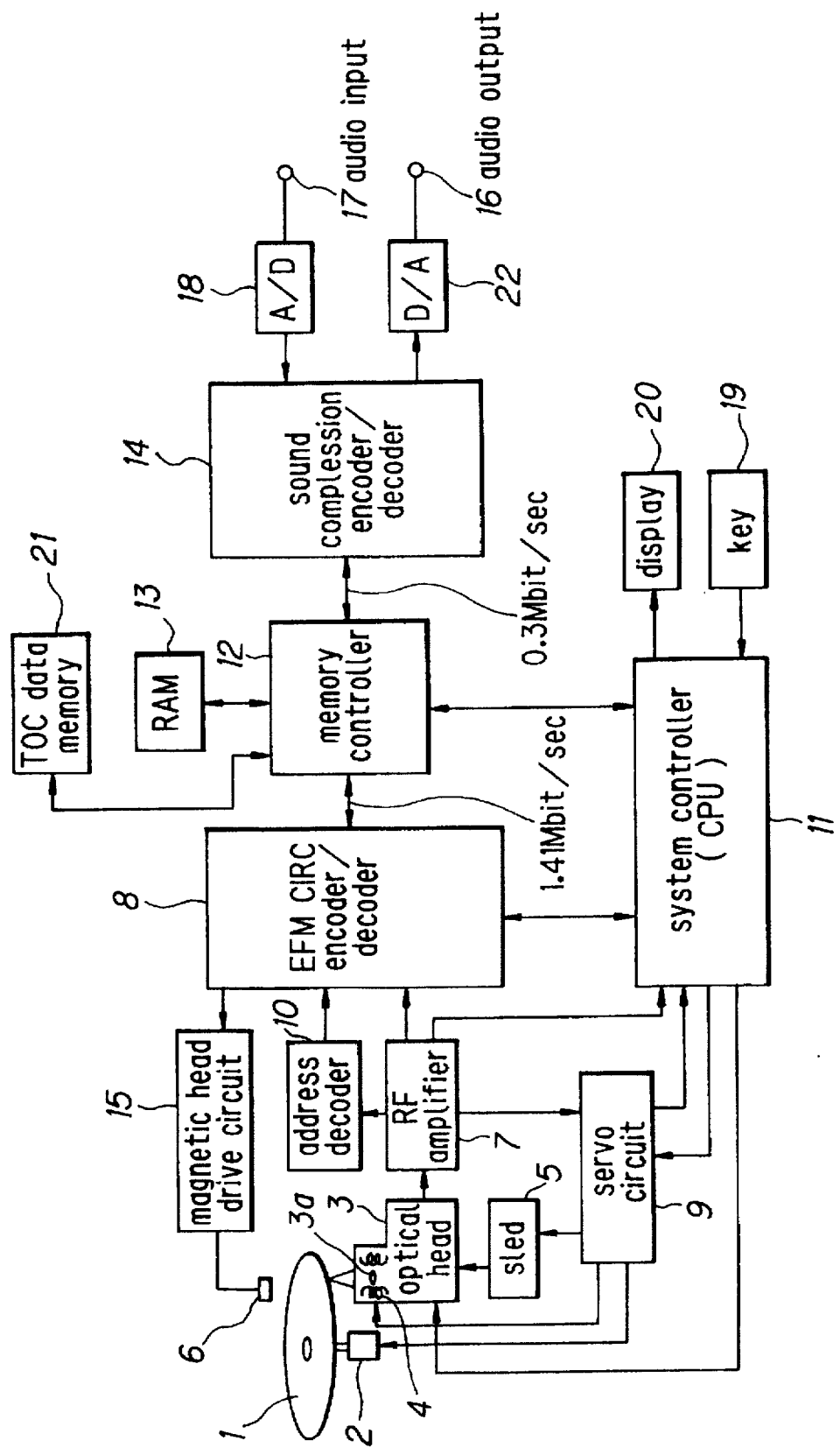
FIG. 2 is a block diagram showing the configuration of an embodiment of a recording and reproducing apparatus of the present invention.

FIG. 2 is a block diagram showing the principle parts of a recording and reproducing apparatus which uses a magneto-optical disc as a recording medium.

In FIG. 2, 1 designates a magneto-optical disc on which, for example, plural pieces of music (sound data) are recorded and which is rotated/driven by a spindle motor 3 designates an optical head for radiating a laser beam onto the magneto-optical disc 1 during recording and reproduction, and which produces a laser output at a high level for heating a recording track up to the Curie-point during recording and a laser output at a relatively low level for detecting data from reflected light through the magnetic Kerr effect during reproduction.

Due to the above, the optical head 3 is equipped with a laser diode as a laser outputting means, an optical system comprising a polarizing beam splitter and an objective lens, and a detector for detecting reflected light. An objective lens 3a is supported by a biaxial mechanism 4 so that it can be displaced in the radial direction of a disc and in directions approaching and separating from the disc. Further, the optical head 3 as a whole can be moved by a sled mechanism 5 in the radial direction of the disc.

Six (6) designates a magnetic head for applying a magnetic field, modulated by data supplied thereto, to the magneto-optical disc, which is disposed in a position opposite to the optical head 3, with the magneto-optical disc 1 interposed therebetween.

The information detected by the optical head 3 from the magneto-optical disc 1 as a result of a reproducing operation is supplied to an RF amplifier 7. The RF amplifier 7 extracts a reproduction RF signal, a tracking error signal, a focus error signal, absolute position information (absolute position information recorded on the magneto-optical disc 1 as a pre-group (wobbling group)), address information, sub-code information, a focus monitor signal and the like by arithmetic processing of the information supplied thereto. The extracted reproduction RF signal is supplied to an encoder/decoder portion 8. Also, the tracking error signal and the focus error signal are supplied to a servo circuit 9 while the address information is supplied to an address decoder 10 to be modulated. The focus monitor signal is supplied to a system controller 11 constituted by, for example, a microcomputer.

The servo circuit 9, by means of the supplied tracking error signal and focus error signal, and a track jump command, seek command, rotational speed detection information and the like from the system controller 11, generates various servo drive signals to control the biaxial mechanism 4 and the sled mechanism 5 to perform focus and tracking control and to control the spindle motor 2 at a constant angular velocity (CAV) or a constant linear velocity (CLV).

The reproduction RF signal is subjected to decoding processes such as EFM modulation, CIRC, and the like in the encoder/decoder portion and is temporarily written into a buffer RAM 13 by a memory controller 12. Data are read by the optical head 3 from the magneto-optical disc 1 and reproduction data are transferred from the optical head 3 to the buffer RAM 13 at 1.41 Mbit/sec.

The data written into the buffer RAM 13 are read out at such a timing that the transfer rate of the reproduction data is 0.3 Mbit/sec., and are supplied to an encoder/decoder portion 14. The data undergo reproduction signal processing such as a decoding process or the like for a sound compression process and are converted by a D/A converter 22 into an analog signal which is in turn supplied from a terminal 16 to a predetermined amplifying circuit portion to be reproduced and output. It is output, for example, as L and R audio signals.

The data read out from the magneto-optical disc 1 is (intermittently) written into the buffer RAM 13 at 1.41 Mbit/sec as described above while the operations of reading data from the buffer RAM 13 and supplying them to the encoder/decoder portion 14 are continuously performed at 0.3 Mbit/sec. Accordingly, if the storage capacity of the buffer RAM 13 is 1 Mbit, data are stored in the buffer RAM 13 to full capacity in 0.9 seconds after reproduction is started, whereafter the data can be output for 3 seconds without the supply of data from the magneto-optical disc 1. In other words, even if the pick-up track-Jumps with more impact during reproduction and data supply from the magneto-optical disc is interrupted, by reading data out from the buffer RAM 13 it is possible to prevent the reproduced sound output from being interrupted.

The absolute position information obtained by decoding the pre-group information output by the address decoder 10 or address information recorded as data is supplied through the encoder/decoder portion 8 to the system controller 11 to be used for various control operations.

Further, the system 11 is also supplied with a lock detection signal of a PLL circuit for generating a bit clock for recording and reproducing operations, and a monitor signal indicating the lack of a frame synchronization signal for reproduction data (L and R channels).

When recording is performed on the magneto-optical disc 1, a recording signal (analog audio signal) supplied to the terminal 17 is converted by an A/D converter 18 into digital data which are in turn supplied to the encoder/decoder portion 14 to be subjected to a sound compression encoding process. The recording data compressed by the encoder/decoder portion 14 are temporarily written into the buffer RAM 13 by the memory controller 12, read out at a predetermined timing, and sent to the encoder/decoder portion 8. After being subjected to encoding processes such as CIRC encoding and EFM modulation at the encoder/decoder portion 8, the data are supplied to a magnetic head driving circuit 15.

The magnetic head driving circuit 15 supplies a magnetic head driving signal to the magnetic head 6 in accordance with the recording data thus encoded. Specifically, it causes the magnetic head 6 to apply an N or S magnetic field to the magneto-optical disc 1. At this time, the system controller 11 supplies a control signal to the optical head 3 to cause it to output a laser beam at a recording power level.

Nineteen (19) designates an operation input portion having keys used for operations carried out by a user and 20 designates a display portion constructed of, for example, a liquid crystal display. Various operation keys are provided on the operation input portion 19 for operations to be carried out by a user.

Figure 3:
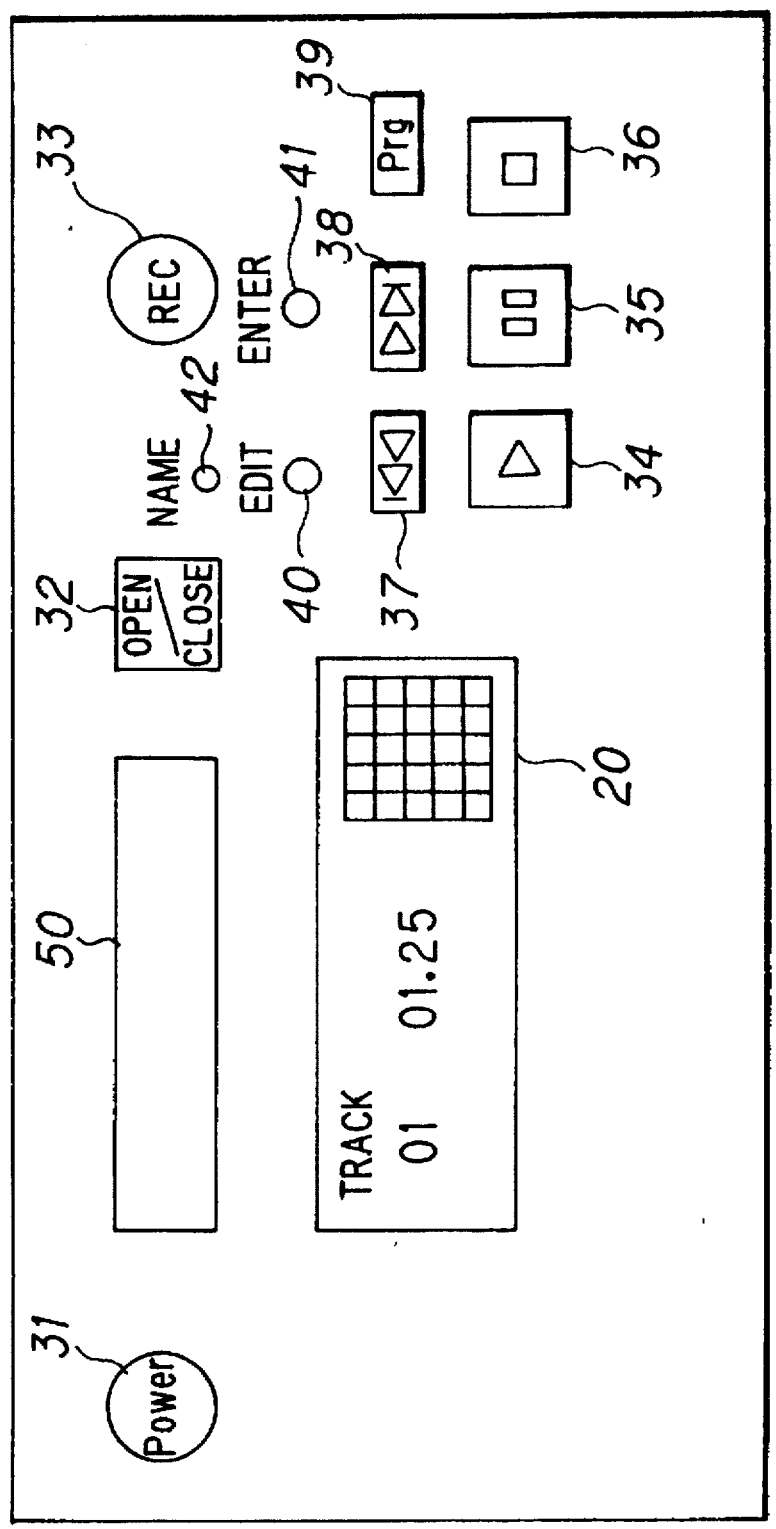
FIG. 3 illustrates an outer panel of a recording and reproducing apparatus of the present invention.

The operation input portion 19 and the display portion 20 are disposed, for example, on the housing (front panel) of the recording and reproducing apparatus as shown in FIG. 3.

In FIG. 3, 31 designates a power source key, 32 designates an open/close key which is operated to pull out and insert a tray 50 on which the magneto-optical disc 1 is loaded, 33 designates a recording key, 34 designates a reproduction key, 35 designates a pause key, 36 designates a stop key, 37 and 38 designate music selection/search keys, and 39 designates a programmed mode key. In addition, an edit key 40 for operations such as data editing on the UTOC, an enter key 41, a name input key 42 and the like are provided.

The display portion 20 is adapted to display the title number assigned to the piece of music being reproduced (track number) and the reproduction time thereof, the current time indicating the position being reproduced, the states of operations such as recording and reproduction and, in addition, the title, the data and time of recording and the like for the piece of music being reproduced, in accordance with the display mode.

In FIG. 2, 21 designates a RAM for storing TOC information of the magneto-optical disc 1 (hereinafter referred to as TOC memory). At the point in time when the magneto-optical disc 1 is loaded or immediately before the recording or reproducing operation, the system controller 11 drives the spindle motor 1 and the optical head 2 to extract the data of the TOC region set, for example, toward the innermost circumference of the magneto-optical disc 1. The TOC information supplied to the memory controller 12 through the RF amplifier 7 and the encoder/decoder portion 8 is stored in a TOC memory 21, whereafter, the system controller 11 uses this TOC information to control the recording and reproducing operations of the magneto-optical disc 1.

Specifically, such a recordable disc medium has a U-TOC region the contents of which can be rewritten when data are recorded or erased as management information for a recording data region as described above and which has a data structure as shown in FIG. 4, for example.

The U-TOC is configured as a data region of, for example, 4 bytes×588. In order to indicate it is the U-TOC region, it has a header at the beginning thereof, which has a synchronization pattern constituted by one-byte data composed entirely of zeros or ones.

Data such as the title number assigned to the first piece of music (first TNO) and the title number assigned to the last piece of music (last TNO) recorded, the status of the utilization of sectors, a disc serial number, and a disc ID are recorded at predetermined addresses. Further, an area is prepared for recording various table pointers (from P-DFA to P-TN0055) as a correspondence table indication data portion for establishing correspondence between recorded pieces of music and the like and a management table portion to be described later.

Two hundred fifty five (255) parts tables from (01) through (FF) are provided as a management table portion and each parts table is capable of recording a start address and an end address at which a segment (in this specification, a segment means a physically continuous track portion) starts and ends, the mode information for the segment and, if the segment is linked to another segment, link information indicating the positions of the parts tables in which the start and end addresses for the segment are linked.

The mode information of a track, i.e. information such as whether or not the segment is set to inhibit overwriting and data-copying, whether the segment includes audio information or not, and whether the segment is monoral or stereo, etc., is recorded. Link information specifies a parts table to be linked using, for example, numbers (01) to (FF) assigned to the parts tables.

In the management table portion, one parts table represents one segment. For a piece of music constructed by linking three segments, the position of the segment is managed by three parts tables linked by the link information.

For each of the parts tables from (01) to (FF) of the management table portion, the contents of the segment are indicated by the table pointers (from P-DFA to P-TN0255) in the correspondence table indication data portion.

The table pointer P-DFA indicates a defective region on the magneto-optical disc 1 and specifies the first of one or more parts tables showing a track portion (segment) which is regarded as a defective region due to damage or the like therein. In other words, if a defective region exists, any one of (01) to (FF) is recorded in the table pointer P-DFA and the defective segment is indicated on the corresponding parts table by the start and end addresses thereof. If there is another defective region, another parts table is indicated as the link information in the aforesaid parts table and the defective segment is also shown therein. If there is no other detective segment, the link information is for example, "(00)" which means there is no further linkage.

The table pointer P-EMPTY indicates the first parts table of one or more unused parts tables in the management table portion. If there is an unused parts table, any one of (01) to (FF) is recorded at the table pointer P-EMPTY. If there are a plurality of unused parts tables, the parts tables are sequentially indicated by the link information starting with the parts table indicated by the table pointer P-EMPTY and all the unused parts tables are linked on the management table.

For example, for a magneto-optical disc on which no recording has been performed at all and no defects exist, none of the parts tables is used. Therefore, linkage is established up to the parts table (FF) such that, for example, the table pointer P-EMPTY designates the parts table (01), the parts table (02) is designated as the link information for the parts table (01), and the parts table (03) is designated as the link information for the parts table (02). In this case, the link information of the parts table (FF) will be "(00)", which indicates that there is no further linkage.

The table pointer P-FRA indicates an area wherein no data is recorded (including an erased area) on the magneto-optical disc 1 and specifies the first of one or more parts tables showing the track portion (segment) which is an unrecorded area. If there is an unrecorded area, any one of (01) to (FF) is recorded at a table pointer P-FRA. The segment which is an unrecorded area is indicated on the corresponding parts table by the start and end addresses thereof. If there are a plurality of such segments, i.e., there are a plurality of parts tables, they are sequentially specified by link information until the parts table whose link information is "(00)" is reached.

Figure 5:
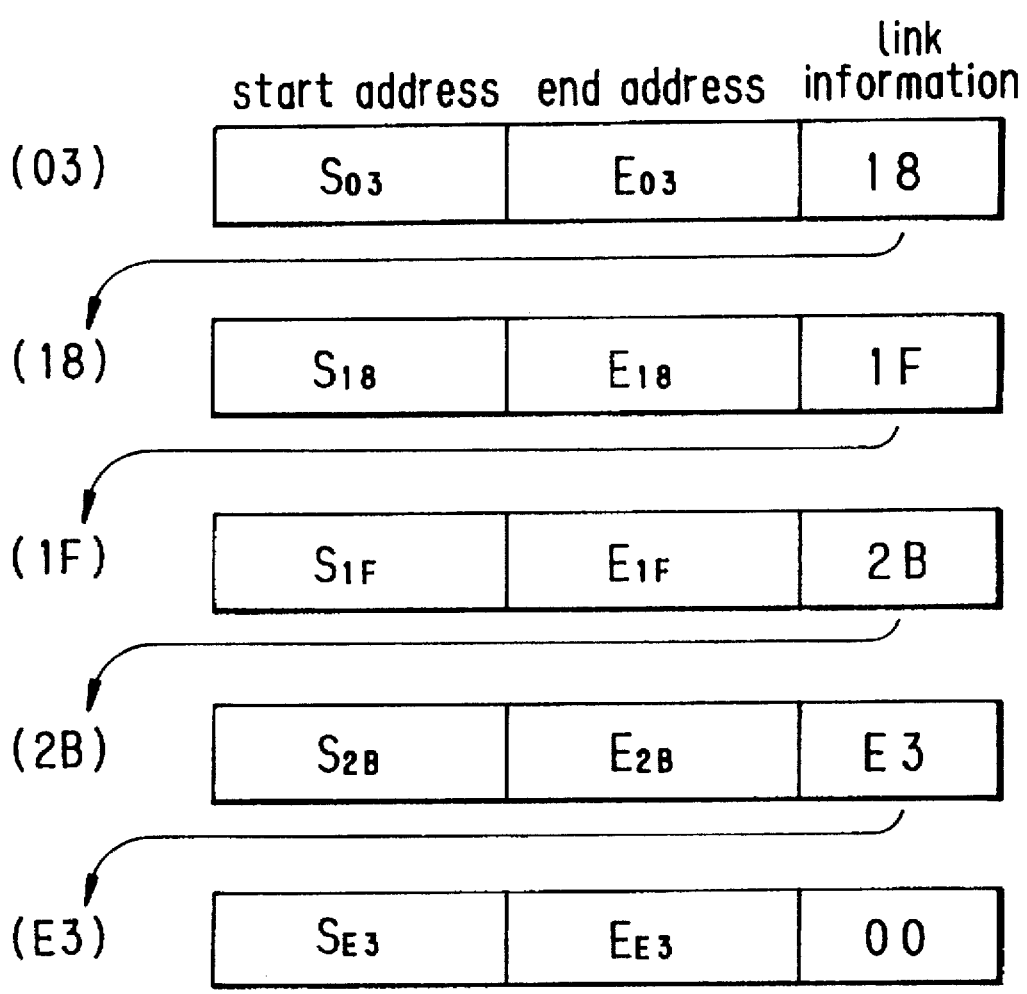
FIG. 5 illustrates a link structure for U-TOC data of a magneto-optical disc adapted for an embodiment of the present invention.

The parts table in FIG. 5 typically shows the status of the management of segments which are unrecorded areas. The table shows that when segments (03), (18), (1F), (2B), and (E3) are unrecorded areas, this state is represented by the table pointer P-FRA followed by the linkage between (03), (18), (1F), (2B) and (E3). The above-described defective regions and unused parts tables are managed in a similar manner.

The table pointers from P-TNO1 to P-TN0255 indicate pieces of music recorded on the magneto-optical disc 1. For example, the table pointer PTNO1 specifies the parts table showing the segment which chronologically comes first among one or more segments in which the first piece of music is recorded.

For example, if the first piece of music is recorded on the disc without splitting the track (i.e. it is recorded as one segment), the recording area of the first piece of music is recorded as the start and end addresses in the parts table specified by the table pointer P-TNO1.

If, for example, the second piece of music is discretely recorded in a plurality of segments on the disc, those segments are specified in chronological order to indicate the positions in which the piece of music is recorded. Specifically, starting with the parts table specified by the table pointer P-TN02, the parts tables are sequentially specified and linked in chronological order in accordance with the link information thereof until the parts table whose link information is "(00)" is reached (in the same manner as in FIG. 5 described above). All the segments in which the data constituting, for example, the second piece of music, are recorded are thus sequentially specified and recorded. As a result, when the second piece of music is reproduced or an overwrite operation is performed on the area of the second piece of music using the U-TOC data, it is possible to extract continuous musical information from the discrete segments by causing the optical head 3 and the magnetic head 6 to access them and to perform recording while efficiently using the recording areas.

The recording and reproducing apparatus for the magneto-optical disc 1 on which such U-TOC data are recorded controls recording and reproducing operations by managing the recording areas on the disc using the U-TOC data read into a TOC memory 21.

Of course, after any change is made in areas having data recorded therein or unrecorded areas as a result of recording, erasing or editing of a certain piece of music, the U-TOC data are rewritten depending on such processes.

The recording and reproducing apparatus of this embodiment makes it possible for a user to easily erase desired pieces of music from those recorded on a magneto-optical disc and to change the order of reproduction (renumber) by rewriting the U-TOC data. The operation to achieve this will now be described.

As is well known in the art, since random access can be easily performed where an optical disc or magneto-optical disc is used as a recording medium, it is easy for a user to specify the order of pieces of music with respect to a µCOM of the reproduction device using a program instruction, thereby reproducing them in the order as specified instead of reproducing them in the actual order of reproduction (the order of the title numbers assigned to the pieces of music), as is widely practiced.

In the present embodiment, erasing and renumbering is carried out using such a program mode. Hereinafter, those processes are referred to as program erasing and program renumbering.

The processes in the program mode will be described with reference to FIG. 6.

When a user pushes the program mode key 39, the system controller 11 proceeds to the processes in the program mode. At this stage, the user inputs and specifies the title numbers assigned to pieces of music, in a desired order. The title numbers are specified using, for example, the music selection and search keys 37 and 38. If a numerical key pad is provided on the operation input portion 19, it may be used instead (F101).

If the user pushes the reproduction key 34 at a certain point in time after sequentially specifying desired pieces of music (F103), the system controller 11 proceeds to a program reproduction process (F104). At this stage, pieces of music are searched and reproduced in the order input by the program. The program reproduction will not be described in detail because it is similar to normal program reproduction.

In the present embodiment, if the user pushes the edit key 40 at a certain point in time after sequentially specifying desired pieces of music (F102), the process proceeds to program erasing or program renumbering instead of program reproduction.

For example, if the user pushes the edit key 40 after sequentially specifying the first, fourth, second and sixth pieces of music using a program at step F101 where the magneto-optical disc 1 has seven pieces of music recorded thereon, the display portion 20 displays, in addition to the specified title numbers "1", "4", "2" and "6", whether program erasing is to be performed or not as shown in FIG. 7(a).

If the enter key 41 is pushed at this point, the system controller 11 performs program erasing (from F105 to F106). When the program erasing is complete, the display portion 20 indicates the completion of the process and the remaining three pieces of music which have not been erased, as shown in FIG. 7(b), to terminate the program mode.

If, on the other hand, the edit key 40 is pushed again when the display is as shown in FIG. 7(a) (F107), the display portion 20 shows a display asking whether program renumbering is to be performed to change the order of reproduction, i.e. the order indicated by the numbers "1", "4", "2" and "6" specified as shown in FIG. 7(c). If the enter key 41 is pushed at this point, the system controller 11 performs program renumbering (from F109 to F110). When program renumbering is complete, the display portion 20 indicates the completion of the process and seven pieces of music, in their new order, terminating the program mode. In this case, the first, fourth, second and sixth pieces of music which have been specified by a program are changed to the first, second, third and fourth and other pieces of music which have not been specified are moved to the fifth and later places.

If the edit key 40 is pushed again when the display is as shown in FIG. 7(c), the process is placed on standby for the execution of the program erasing as shown in FIG. 7(a) (from F108 to F105). If the stop key 36 is pushed in this standby mode, the process is not executed and the program mode is terminated (F111, F112).

(Program Erasing Process)

Figure 8:
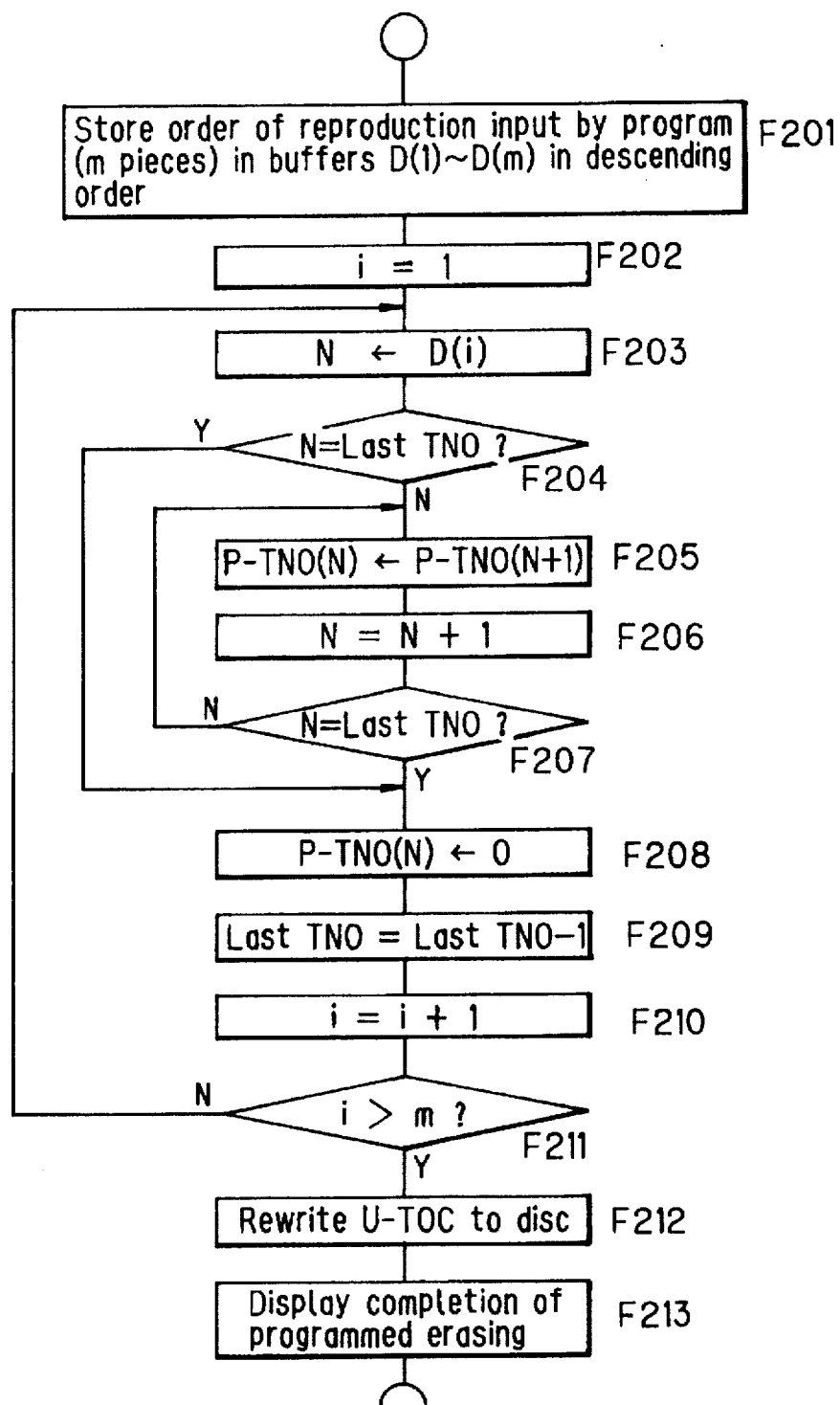
FIG. 8 is a flow chart of a program erasing process according to an embodiment of the present invention.

The program erasing process at step F106 is shown in FIG. 8 in detail.

The process will be described with reference to an example wherein a total of seven pieces of music are recorded on the magneto-optical disc 1 and a user specifies the title numbers "1, 4, 2, 6" and performs program erasing.

In the state wherein all seven pieces of music are recorded, each piece of music is managed by table pointers P-TNO1 through P-TN0225 in U-TOC as shown in <A> in (Table 1).

(TABLE 1)

| Title Number | <A> Table Pointer (before erasure) | <B> Table Pointer (during erasure) | <C> Table Pointer (after erasure) |
| --- | --- | --- | --- |
| 1 | P-TNO2 = P1 | P-TNO2 = P1 | P-TNO2 = P3 |
| 2 | P-TNO3 = P2 | P-TNO3 = P2 | P-TNO3 = P5 |
| 3 | P-TNO4 = P3 | P-TNO4 = P3 | P-TNO4 = P7 |
| 4 | P-TNO5 = P4 | P-TNO5 = P4 | P-TNO5 = 0 |
| 5 | P-TNO6 = P5 | P-TNO6 = P5 | P-TNO6 = 0 |
| 6 | P-TNO7 = P6 | P-TNO7 = P7 | P-TNO7 = 0 |
| 7 | P-TNO1 = P7 | P-TNO1 = 0 | P-TNO1 = 0 |
| 8 | P-TNO1 = 0 | P-TNO1 = 0 | P-TNO1 = 0 |
| . | . | . | . |
| 255 | P-TNO255 = 0 | P-TNO255 = 0 | P-TNO255 = 0 |

It is assumed that P1 through P7 are values indicating predetermined parts tables in the management table portion. Since there are seven pieces of music in total, the table pointers P-TN08 through P-TN0255 indicating eighth and later pieces of music are set to the value "0" and no parts table is shown.

Where the user specifies "1, 4, 2, 6" using a program, the system controller 11 first records the m pieces (four pieces in this case) of title numbers in buffers D(1) through D(m) in descending order (F201). Therefore, D(1)=6, D(2)=4, D(3)=2, and D(4)=1 in this case.

Next, a variable i is set to 1 (F202), and a variable N is set to the value of the buffer D(i) (F203).

Reference is now made to the data Last TNO wherein the last title number is stored in the U-TOC to confirm N=LastTNO (F204). If N=LastTNO, i.e. if the last title number is included in those specified for erasure, the process proceeds to step F208. In this case, since the variable N=D(i)=D(1)=6 and LastTNO=7, the process proceeds to step F205. Steps F205 through F207 perform a process of erasing a certain piece of music by decrementing the title numbers of the pieces of music after the piece of music erased. This is achieved by first writing the value of the table pointer P-TNO(N+1) in the table pointer P-TNO(N) (F205), incrementing the variable N (F206) and repeating this until the last title number for which N=LastTNO is reached (F207).

In the above example of the program, since N=6, the P7, i.e. the value of the table pointer P-TN07, is written in the table pointer P-TN06. When the variable N equals Last TNO (i.e. N=7), the process proceeds to step F208, wherein the table pointer P-TN07 is set to 0. As a result, the table pointers are rewritten as shown in <B> in (Table 1); the piece of music which was originally the sixth piece of music is erased; and the seventh piece of music becomes the new sixth piece of music. When the piece of music having the last title number is erased, there is no need to advance the title number. Therefore, erasing is carried out by directly proceeding from F204 to F208 as described above.

Next, since one piece of music has been erased, the datum Last TNO indicating the last title number is rewritten to show a value incremented by one (F209).

Next, the variable i is incremented (F210) and the process returns to step F203 if i>m, to process the next piece of music to be erased. In this case, N=D(i)=D(2)=4. Therefore, steps F204 through F209 similarly erase the fourth piece of music, move up the fifth and later pieces of music, and decrement the value of the Last TN0.

Specifically, the value of the P-TN05 is written in the table pointer P-TN04; the value of the P-TN06 is written in the table pointer P-TN05; the table pointer P-TNO6 is set to 0; and the Last TN0 is set to 0.

The variable i is further incremented to similarly perform erasure of the second and first pieces of music and, when erasure of the first piece of music is complete, step F211 results in i>m (m is the number of pieces of music specified by the program) to terminate the U-TOC rewriting operation for the program erasing process. At this point, the table pointers are as shown in <C> in (Table 1). That is, the four pieces of music specified have been erased and the remaining three pieces of music have been newly assigned the first, second and third title numbers. The Last TNO is of course set at 3 at this point.

The above-described process in a process for rewriting the data in the TOC memory 21 and the U-TOC area in the magneto-optical disc 1 has not been actually rewritten yet. Therefore, step F212 is entered to actually write the new data as shown in <C> in (Table 1) in the magneto-optical disc 1. A display is then made to indicate the completion of program erasing as described with reference to FIG. 7(b) (F213) to terminate the process in the program mode.

The program erasing process as described above erases the pieces of music as specified by the user making the operations at the user side simple and errorless.

(Program Renumbering Process)

Figure 6:
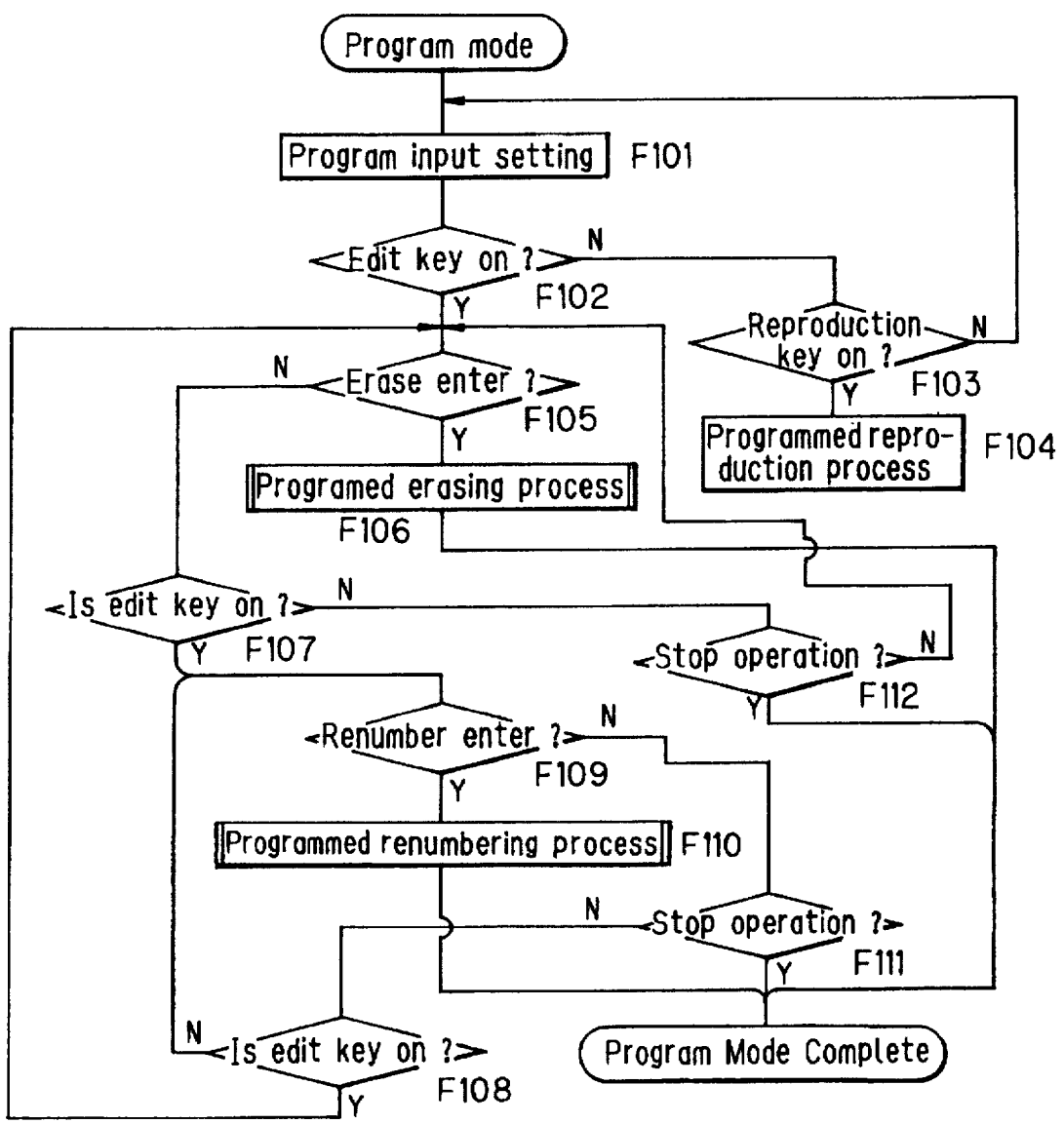
FIG. 6 is a flow chart of a process in a program mode according to an embodiment of the present invention.
Figure 9:
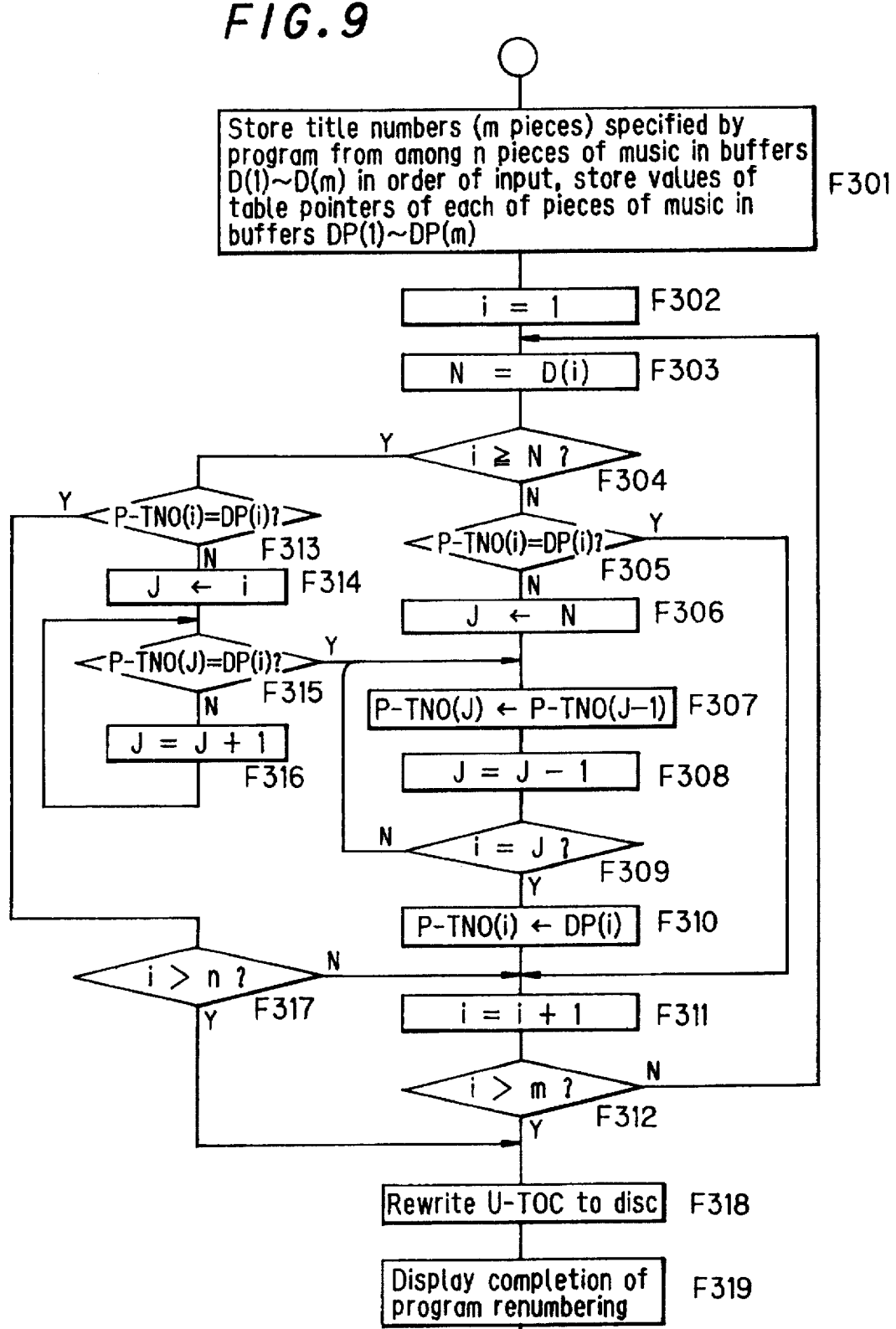
FIG. 9 is a flow chart of a program renumbering process according to an embodiment of the present invention.

FIG. 9 shows the details of the program renumbering process at step F110 in FIG. 6.

The process will be described with reference to an example wherein a total of seven pieces of music are recorded on the magneto-optical disc 1 and a user specifies the title numbers "5, 2, 1, 6, 4" and performs program renumbering.

In the state wherein all seven pieces of music are recorded, each piece of music is managed by table pointers P-TNO1 through P-TN0225 in U-TOC as shown in <A> in (Table 2).

the variable J decremented, the table pointers are rewritten as shown in <C>, <D>, and <E> in (Table 2). In the state (TABLE 2)

| Title No. | Pointer | <A> | <B> | <C> | <D> | <E> | <F> | <G> | <H> | <I> | <J> | <K> | <L> | <M> | <N> | Pointer | Title No. |
|---|---|---|---|---|---|---|---|---|---|---|---|---|---|---|---|---|---|
| 1 | P-TNO1 | P1 | P1 | P1 | P1 | P1 | P5 | P5 | P5 | P5 | P5 | P5 | P5 | P5 | P5 | P-TNO1 | 1 |
| 2 | P-TNO2 | P2 | P2 | P2 | P2 | P1 | P1 | P1 | P2 | P2 | P2 | P2 | P2 | P2 | P2 | P-TNO2 | 2 |
| 3 | P-TNO3 | P3 | P3 | P3 | P2 | P2 | P2 | P1 | P1 | P1 | P1 | P1 | P1 | P1 | P1 | P-TNO3 | 3 |
| 4 | P-TNO4 | P4 | P4 | P3 | P3 | P3 | P3 | P3 | P3 | P3 | P3 | P3 | P6 | P6 | P6 | P-TNO4 | 4 |
| 5 | P-TNO5 | P5 | P4 | P4 | P4 | P4 | P4 | P4 | P4 | P4 | P4 | P3 | P3 | P3 | P4 | P-TNO5 | 5 |
| 6 | P-TNO6 | P6 | P6 | P6 | P6 | P6 | P6 | P6 | P6 | P6 | P4 | P4 | P4 | P3 | P3 | P-TNO6 | 6 |
| 7 | P-TNO7 | P7 | P7 | P7 | P7 | P7 | P7 | P7 | P7 | P7 | P7 | P7 | P7 | P7 | P7 | P-TNO7 | 7 |
| 8 | P-TNO8 | 0 | 0 | 0 | 0 | 0 | 0 | 0 | 0 | 0 | 0 | 0 | 0 | 0 | 0 | P-TNO8 | 8 |
| ... | | | | | | | | | | | | | | | | | |
| 255 | P-TNO255 | 0 | 0 | 0 | 0 | 0 | 0 | 0 | 0 | 0 | 0 | 0 | 0 | 0 | 0 | P-TNO255 | 255 |

In (Table 2), it is assumed just as for (Table 1) that P1 through P7 are the values indicating predetermined parts tables in the management table portion. Since there are seven pieces of music in total, the values of the table pointers P-TN08 through P-TNO255 indicating the eighth and later pieces of music are set to "0" and no parts table is shown.

Where the user specifies "5, 2, 1, 6, 4" using a program, the system controller 11 first records the pieces (four pieces in this case) of title numbers m specified by the program from among the total pieces of music n in buffers $D(1)$ through $D(m)$ in the order in which they are input. Therefore, $D(1)=5$, $D(2)=2$, $D(3)=1$, $D(4)=6$, and $D(5)=4$ in this case. At the same time, the values maintained by table pointers for those title numbers are stored in buffers $DP(1)$ through $DP(m)$ in correspondence to the buffers $D(1)$ through $D(m)$. Specifically, $DP(1)=P5$, $DP(2)=P2$, $DP(3)=P1$, $DP(4)=P6$, and $DP(5)=P4$ (F301).

Next, a variable i is set to 1 (F302), and a variable N is set to the value of the buffer $D(i)$ (F303).

The variable i and the variable N are then compared to each other (F304). If $i>=N$, the process proceeds to step F313 and, if $i<N$, the process proceeds to step F305. In the example of the specification by a program as described above, the variables are $N=D(i)=D(1)=5$ and $i<N$, so the process proceeds to step F305. Steps F205 through F207 perform a process of moving the piece of music having the title number corresponding to the variable N to a position specified by the program and shifting the title numbers for other pieces of music if necessary.

Therefore, the table pointer P-TNO(i) and the buffer DP(i) are first compared to each other (F305). If the table pointer P-TNO(i) equals the buffer DP(i), the number assigned to the piece of music coincides with the title number in accordance with the order specified, and since no change is required, the process proceeds as is to step F311. If P-TNO(i)≠DP(i), a change is necessary. Then, the value of the variable N is written in a variable J (F306) and thereafter the value of the table pointer P-TNO(J−1) is written in the table pointer P-TNO(J) (F307). This is repeated while decrementing the variable J (F309) until the variable J equals the variable i (F310).

In the above example of the program wherein J=5, P4, which is the value of the table pointer P-TN04, is written in the table pointer P-TNO5 at step F307 when the variable J equals 5, resulting in the state of the table pointers as shown in <B> in (Table 2) (the portions rewritten are underlined). Thereafter, as the process proceeds through step F307 with <E>, the variable J=1=variable 1. Therefore, the process proceeds to step F310 to write the value of the buffer DP(i) in the table pointer P-TNO(i). Specifically, the table pointer P-TNO1 equals P5 as shown in <F> in (Table 2). The process up to this point changes the piece of music which was originally the fifth piece of music to the new first number.

Next, the variable i is incremented (step F311) and, if the variable i is not greater than m (m is the number of pieces of music specified by the program) (F312), the process returns to step F303 to process the next title number specified. In this case, since the variable equals 2, $N=D(i)=D(2)=2$. At this point, since the variable i equals the variable N, the process proceeds to step F313.

In this case, the values of the table pointer P-TN0(i) and the buffer DP(i) are first compared to each other. If the table pointer P-TNO(i) equals the buffer DP(i), the number of the piece of music coincides with the title number in accordance with the order specified. Therefore, no change is required and the process proceeds to step F311 after comparing the variables i and n (n is the number of the pieces of music) at step F317. On the other hand, if P-TNO(i)≠DP(i), a changes is required.

Then, the value of the variable i is first written in the variable J (F314) and the variable J is incremented until the table pointer P-TNO(J) equals the buffer DP(i) (F315, F316).

In the above example, the variable i equals 2 at this point and the buffer DP(i)=DP(2)=P2. On the other hand, the table pointer P-TNO(i) is set to P1 as shown in <F> in (Table 2). Therefore, P-TNO(i)≠DP(i) and the table pointer P-TNO(J) is compared to the buffer DP(i) with the variable J incremented. Since the table pointer P-TNO(3) equals P2 in the state <F>, the table pointer P-TNO(J)=buffer DP(i)=P2 when J=3. Then, the process proceeds to step F307.

At step F307, the value of the table pointer P-TNO(J−1) is written in the table pointer P-TNO(J). Therefore, the table pointer P-TN03 equals P1 as shown in <G> in (Table 2). When the variable J is decremented (F308) to 2, the variable J equals the variable i. Then, P2 which is the value of the buffer DP(2) is written in the table pointer P-TN02 at step F310 resulting in the state as shown in <H> in (Table 2). Specifically, among the 5, 2, 1, 6, 4 specified by the program, the fifth and second pieces of music have newly become the first and second pieces of music.

Thereafter, the variable i is incremented and the process returns to step F303 to process the third piece of music newly established. The process proceeds to step F313 because the variable i=3, the variable N=D(3)=1, and i>=N. At this point, since the table pointer P-TNO(i)=P-TNO(3)= DP(i)=DP(3)=P1, no change is required (the state shown in <I> in (Table 2)) and the process proceeds to the step F311 to process the newly established fourth piece of music.

When i=4, the variable N=D(4)=6 and i<N, so the process proceeds to step F305. At this point, since the table pointer P-TNO(i)=P-TNO(4)=P3 while DP(i)=DP(4)=P6, the processes at steps F306 through F309 are carried out.

As a result, the table pointers are rewritten as shown in <J> and <K> in (Table 2) and are further rewritten as shown in <L> at step F310.

When the variable i is incremented to 5, the process proceeds to step F313 because the variable N=D(5)=4 and i>=N. Since the table pointer P-TNO(i)=P-TNO(5)=P3 while DP(i)=DP(5)=P4, the process proceeds to step F307 after the variable J is changed by the processes at steps F314 through F316. The table pointers are rewritten as shown in <M> in (Table 2) by the processes at steps F307 through F309 and are further rewritten as shown in <N> at step F310.

Since the variable is i>m at step F312, the process of rewriting the U-TOC in the TOC memory 21 for program renumbering is completed. At this point, as the U-TOC data in the TOC memory 21, the order of reproduction is changed based on "5, 2, 1, 6, 4" as specified by the program, and the values of the table pointers P-TN07 through P-TN07 are sequentially changed to P5, P2, P1, P6, P4, P3 and P7, i.e, changed to the order "5, 2, 1, 6, 4, 3, 7" (the title numbers which are not specified by the program are moved backward.)

When the above-described process of rewriting the data in the TOC memory 21 is complete, the process proceeds to step F318 to actually write new data in the state shown in <N> in (Table 2) into the U-TOC area of the magneto-optical disc 1. Then, a display is made to indicate that the program renumbering has been completed as described with reference to FIG. 7(d) (F319) to terminate the process in the program mode.

With the program renumbering process as described above, the user can change the order of reproduction very easily and accurately.

Although the procedures for program erasing and program renumbering have been described in detail, various procedures other than those described above may be contemplated and the manner in which the buffer memory is used may be changed depending on the apparatus and memory capacity. Of course, the operation keys may be set and operated in various ways other than those described.

As described above, the recording and reproducing apparatus of the present invention allows a user to erase pieces of music which have been programmed and to change the order of reproduction (title numbers) in an order which has already been programmed. As a result, it has the advantages that the erasing of plural pieces of music and the changing of the order of reproduction can be carried out very easily and that errors in erasing and renumbering can be reduced.

What is claimed is:

1. An apparatus for recording data onto and reproducing data from a recording medium, the recording medium having a series of address pointers stored in a corresponding series of memory locations in a table of contents region where the series of memory locations represent a corresponding series of title numbers, each address pointer identifying a memory location on the disc where information associated with a corresponding title number is located, the apparatus comprising:

reproducing means for reproducing the series of address pointers;

memory means for storing the series of address pointers in a corresponding series of memory locations in a data table, the series of memory locations in the data table representing the corresponding series of title numbers;

input means for sequentially entering a plurality of title numbers without reproducing data associated with the title numbers t6 form a desired order of title numbers;

buffer means for storing the desired order of title numbers;

display means for simultaneously displaying all of the title numbers in the desired order of title numbers;

control means for changing the series of address pointers stored in the data table to form a new series of address pointers in response to a first user command so that the new series of address pointers correspond to the desired order of title numbers; and recording means for recording the new sequence of address pointers in the series of memory locations on the disc.

2. The apparatus of claim 1 wherein when the title numbers in the desired order of title numbers is less than the title numbers corresponding to the address pointers stored in the data table, the title numbers not entered as part of the desired order of title numbers are added to the end of the desired order of title numbers.

3. The apparatus of claim 1 wherein the control means deletes the address pointers associated with the desired order of title numbers in response to a second user command.

4. The apparatus of claim 1 wherein the control means further comprises:

means for determining whether the address pointer that identifies a title number in the desired order of title numbers is stored in a memory location of the corresponding series of memory locations that corresponds to the order of the title number in the desired order of title numbers;

means for moving the address pointer that identifies a title number in the desired order of title numbers into a memory location of the corresponding series of memory locations that corresponds with the order of the title number, and for moving each of the address pointers in the memory locations of the corresponding series of memory locations that fall between the memory location that corresponds with the order of the title number and a memory location that corresponds with where the title number was previously held to a next greater memory location when the title number in the desired order of title numbers is stored in a memory location that does not correspond to the order of the title number in the desired order of title numbers.

5. The apparatus of claim 4 wherein the recording medium includes a first region where data is stored, and a second region arranged on an inside portion of the recording medium where management data is stored, the table of contents region being located in the second region.

6. The apparatus of claim 4 wherein the recording means includes an optical head and a magnetic head, and wherein the optical and magnetic heads record the new sequence of address pointers in the table of contents region of the second region.

7. A method for reordering a series of address pointers stored in a corresponding series of memory locations in a table of contents region of a disc where the series of memory locations represent a corresponding series of title numbers, each address pointer identifying a memory location on the disc where information associated with a corresponding title number is located, the method comprising the steps of:

reproducing the series of address pointers;

storing the series of address pointers in a corresponding series of memory locations in a data table, the series of memory locations in the data table representing the corresponding series of title numbers;

sequentially entering a plurality of title numbers without reproducing data associated with the title numbers to form a desired order of title numbers;

storing the desired order of title numbers;

simultaneously displaying all of the title numbers in the desired order of title numbers;

changing the series of address pointers stored in the data table to form a new series of address pointers so that the new series of address pointers correspond to the desired order of title numbers; and recording the new sequence of address pointers in the series of memory locations on the disc.

8. The method of claim 7 wherein when the title numbers in the desired order of title numbers is less than the title numbers corresponding to the address pointers stored in the data table, the title numbers not entered as part of the desired order of title numbers are added to the end of the desired order of title numbers.

9. The method of claim 7 wherein the changing step further includes the steps of:

determining whether the address pointer that identifies a title number in the desired order of title numbers is stored in a memory location of the corresponding series of memory locations that corresponds to the order of the title number in the desired order of title numbers; and moving the address pointer that identifies a title number in the desired order of title numbers into a memory location of the corresponding series of memory locations that corresponds with the order of the title number, and for moving each of the address pointers in the memory locations of the corresponding series of memory locations that fall between the memory location that corresponds with the order of the title number and a memory location that corresponds with where the title number was previously held to a next greater memory location when the title number in the desired order of title numbers is stored in a memory location that does not correspond to the order of the title number in the desired order of title numbers.

10. An apparatus for recording data onto and reproducing data from a recording medium, the recording medium having a first region where data is stored, and a second region arranged on an inside portion of the recording medium where management data is stored, a series of address pointers being stored in a corresponding series of memory locations in a table of contents region of the second region where the series of memory locations represent a corresponding series of title numbers, each address pointer identifying a memory location in the first region of the disc where information associated with a corresponding title number is located, the apparatus comprising:

reproducing means for reproducing the series of address pointers;

memory means for storing the series of address pointers in a corresponding series of memory locations in a data table, the series of memory locations in the data table representing the corresponding series of title numbers;

input means for sequentially entering a plurality of title numbers without reproducing data associated with the title numbers to form an entered order of title numbers;

buffer means for storing the entered order of title numbers;

display means for simultaneously displaying all of the title numbers in the entered order of title numbers;

control means for changing the series of address pointers stored in the data table to form a new series of address pointers in response to a first user command and the entered order of title numbers, the control means including:

erasing means for invalidating selected address pointers stored in the memory means; and editing means for changing an order of selected address pointers; and recording means for recording the new sequence of address pointers in the series of memory locations in the first region of the disc, the recording means including an optical head and a magnetic head.

11. The apparatus of claim 10 wherein the editing means further comprises:

means for determining whether the address pointer that identifies a title number in the entered order of title numbers is stored in a memory location of the corresponding series of memory locations that corresponds to the order of the title number in the entered order of title numbers;

means for moving the address pointer that identifies a title number in the entered order of title numbers into a memory location of the corresponding series of memory locations that corresponds with the order of the title number, and for moving each of the address pointers in the memory locations of the corresponding series of memory locations that fall between the memory location that corresponds with the order of the title number and a memory location that corresponds with where the title number was previously held to a next greater memory location when the title number in the entered order of title numbers is stored in a memory location that does not correspond to the order of the title number in the entered order of title numbers.

12. The apparatus of claim 10 wherein the erasing means further comprises means for moving the address pointers stored in each memory location having a memory address greater than a memory address of the memory location that corresponds to a title number of the entered order of title numbers to a next lower memory location for each title number in the entered order of title numbers in an order ranging from a highest title number to a lowest title number.

13. The apparatus of claim 12 and further comprising means for indicating, after the address pointers have been moved for each title number, which memory locations contain invalid information.

14. A method for recording data onto and reproducing data from a recording medium, the recording medium having a first region where data is stored, and a second region arranged on an inside portion of the recording medium where management data is stored, a series of address pointers being stored in a corresponding series of memory locations in a table of contents region of the second region where the series of memory locations represent a corresponding series of title numbers, each address pointer identifying a memory location in the first region of the disc where information associated with a corresponding title number is located, the method comprising the steps of:

reproducing the series of address pointers;

storing the series of address pointers in a corresponding series of memory locations in a data table, the series of memory locations in the data table representing the corresponding series of title numbers;

sequentially entering a plurality of title numbers without reproducing data associated with the title numbers to form an entered order of title numbers;

storing the entered order of title numbers;

simultaneously displaying all of the title numbers in the entered order of title numbers;

changing the series of address pointers stored in the data table to form a new series of address pointers in response to a first user command and the entered order of title numbers; and recording the new sequence of address pointers in the series of memory locations in the first region of the disc, the recording means including an optical head and a magnetic head.

15. The method of claim 14 wherein the changing step further comprises the steps of:

determining whether the address pointer that identifies a title number in the entered order of title numbers is stored in a memory location of the corresponding series of memory locations that corresponds to the order of the title number in the entered order of title numbers; and moving the address pointer that identifies a title number in the entered order of title numbers into a memory location of the corresponding series of memory locations that corresponds with the order of the title number, and for moving each of the address pointers in the memory locations of the corresponding series of memory locations that fall between the memory location that corresponds with the order of the title number and a memory location that corresponds with where the title number was previously held to a next greater memory location when the title number in the entered order of title numbers is stored in a memory location that does not correspond to the order of the title number in the entered order of title numbers.

16. The method of claim 14 wherein the changing step further includes the step of moving the address pointers stored in each memory location having a memory address greater than a memory address of the memory location that corresponds to a title number of the entered order of title numbers to a next lower memory location for each title number in the entered order of title numbers in an order ranging from a highest title number to a lowest title number.

17. The method of claim 16 wherein the changing step further includes the step of indicating, after the address pointers have been moved for each title number, which memory locations contain invalid information.

18. The method of claim 14 wherein the changing step further includes the steps of:

identifying a memory location that corresponds to the highest title number of the entered order of title numbers;

moving data stored in each memory location that is greater than the memory location that corresponds to the highest title number of the entered order of title numbers to a next lower memory location;

determining a memory location that corresponds to the next highest title number of the entered order of title numbers;

transferring data stored in each memory location that is greater than the memory location that corresponds to a next highest title number of the entered order of title numbers to a next lower memory location; and continuing the determining and transferring steps until data stored in each memory location that is greater than the memory location that corresponds to the lowest title number of the entered order of title numbers is transferred.

19. The method of claim 18 and further comprising the step of indicating, after the moving step and each transferring step, that a content of a highest memory location from which data was moved is invalid.

20. The method of claim 18 and further comprising the step of indicating that a content of the highest memory location of the corresponding series of memory locations is invalid when the memory location of the highest title number of the entered order of title numbers is the same as the highest memory location of the corresponding series of memory locations.

* * * * *

UNITED STATES PATENT AND TRADEMARK OFFICE
CERTIFICATE OF CORRECTION

PATENT NO. : 5,706,262
DATED : January 6, 1998
INVENTOR(S) : TEPPEI YOKOTA ET AL.

It is certified that error appears in the above-indentified patent and that said Letters Patent is hereby corrected as shown below:

Column 14, line 9, please delete "t6" and insert therefor --to--.

Signed and Sealed this

Twenty-fifth Day of August, 1998

Attest:

BRUCE LEHMAN

Attesting Officer

Commissioner of Patents and Trademarks